(No Model.)
C. FISHER.
MARKING STICK.
No. 371,133. Patented Oct. 4, 1887.
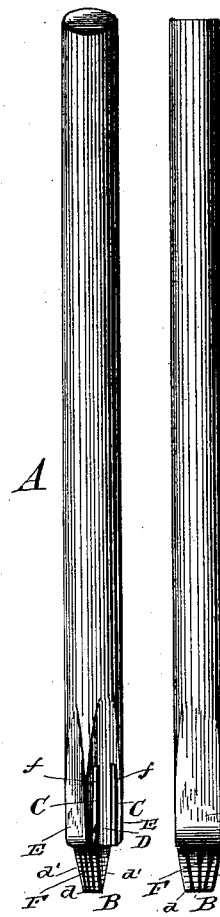
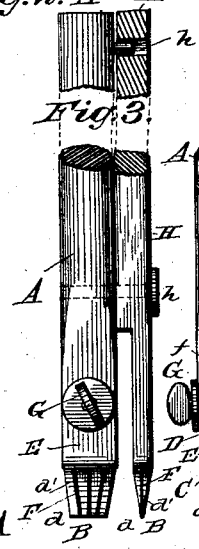
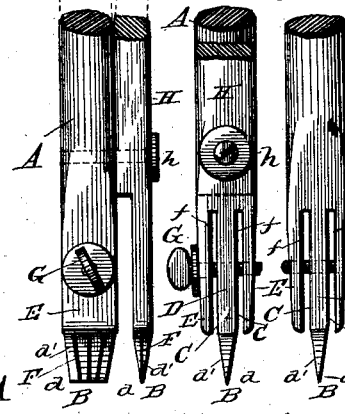
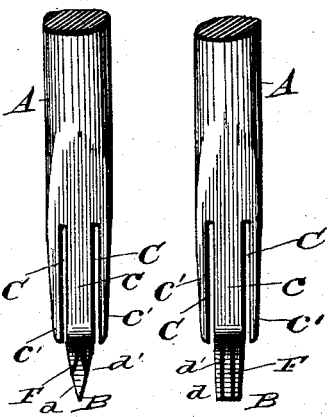
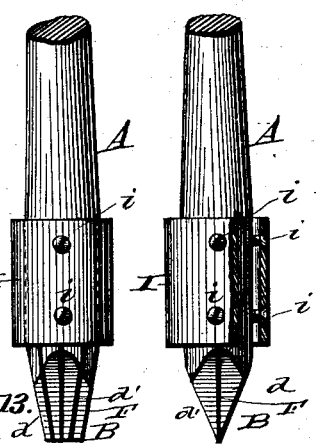
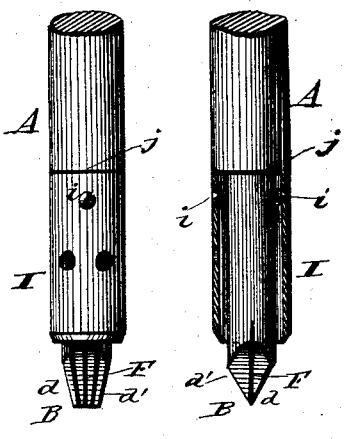
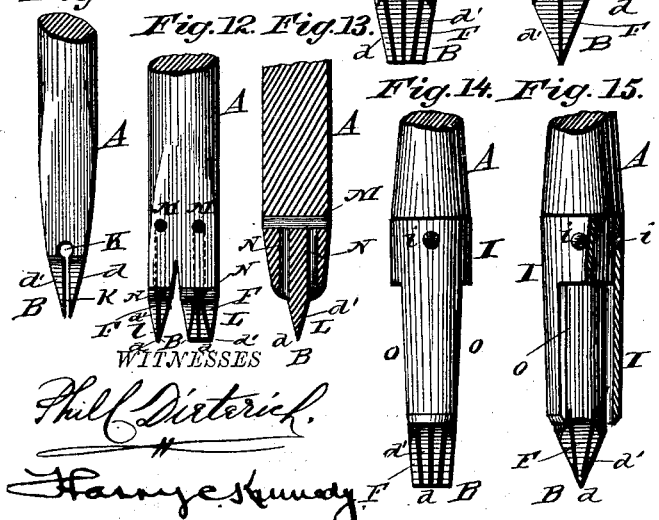
WITNESSES
INVENTOR
Chas. Fisher
By his Attorney

UNITED STATES PATENT OFFICE.

CHARLES FISHER, OF MANITOWOC, WISCONSIN, ASSIGNOR, BY DIRECT AND MESNE ASSIGNMENTS, TO THE SUN GAS LIGHT COMPANY, OF WISCONSIN.

MARKING-STICK.

SPECIFICATION forming part of Letters Patent No. 371,133, dated October 4, 1887.

Application filed July 11, 1887. Serial No. 244,007. (No model.)

*To all whom it may concern:*

Be it known that I, CHARLES FISHER, of Manitowoc, in the county of Manitowoc and State of Wisconsin, have invented certain new and useful Improvements in Marking-Sticks; and I do hereby declare the following to be a full, clear, and exact description of the invention, such as will enable others skilled in the art to which it pertains to make and use the same.

My invention relates to marking-sticks, the object being to provide a device of this character which will be adapted for either plain marking (as for package-addressing) or ornamental lettering.

A further object of the invention is to provide a cheap and simple marking-stick which may be used after the manner of a pen or pencil, and will be capable of marking on a backward as well as on a forward stroke.

With these ends in view the invention consists in a marking-stick provided with an ink-storing space adjacent to its point and grooves or openings leading from said space to the point of the stick.

The invention further consists in the features of construction hereinafter fully described, and pointed out in the claims.

In accompanying drawings, Figure 1 represents a perspective view of a simple form of stick embodying my invention. Fig. 2 is a side view of the same. Figs. 3 and 4 illustrate one form of a double marking-stick made in accordance with my invention. Figs. 5, 6, 7, 8, 9, 10, 11, 12, 13, 14, 15, 16, and 17 illustrate different forms of the device, all embodying the invention.

Referring to Figs. 1 and 2, A represents the stick, tapered at one end to form a marking-point, B.

C C represent parallel longitudinal slits formed in the point end of the stick and serving to divide said point end into three sections—to wit, a central portion or point, D, and two counterpart wings, E E. The extreme point $d$ is tapered on all sides, and the front and rear sides, $d'$ $d'$, are formed with radial grooves F. The spaces $f$ $f$ between the point D and the wings E E serve as ink-retaining spaces, and the ink is fed from them to the point through the grooves F as the stick is moved in marking.

In Figs. 3 and 4 I have added to the stick A (shown in Figs. 1 and 2) a thumb screw, G, which extends through the wings and point, as shown, and is designed to control the flow of ink.

H represents a supplemental marker of substantially the same construction at its point as the stick A, but preferably narrower. This marker H is pivotally secured to the stick A by a suitable pivot, $h$, and the two sticks are held together detachably by a pin-and-hole connection, $h'$, near their upper ends. The stick H is adapted to be swung away from the stick A to facilitate dipping ink, and is then thrown back, and its spring action will snap it in place over the pin in the stick A. The stick H is recessed slightly on the side next the stick A, to prevent the admixing of the respective inks on the two points. Thus it will be seen that two different colors of ink may be used at the same time when ornamental letters are to be made; or, if desired, three or even more sticks might be combined in the same manner.

In Figs. 5 and 6 I have shown a form of marker differing from stick A of Figs. 1 and 2 only in the feature of having four slits, C, which cross each other to form four fingers, $c$, and four wings, $c'$. This construction affords a greater ink-storing space. (Shown in Figs. 1 and 2.)

In Figs. 7 and 8 the point of the stick is beveled and grooved on all sides, and a tube, I, encircles the stick just above the point where it is secured by screws $i$. In this instance the ink is stored between the tube and stick and is fed through the groove.

The device shown in Figs. 9 and 10 is similar to that seen in Figs. 7 and 8, excepting that the stick is formed with a shoulder, $j$, against which the upper end of the tube I bears, and about midway the length of the tube an annular series of holes is formed to allow the air to escape from within the tube when the stick is dipped in the ink.

In Fig. 11 I show a tapered point, which is transversely bored to form an ink-storing space, K, communicating with the point by a vertical slit, k.

In Figs. 12 and 13 the point is divided to form two independent marking-points, L l, and transverse openings M are formed above the point, which communicate with vertical openings N. These transverse and vertical openings constitute the ink-storing space from which the ink passes to the grooves of the point.

In Figs. 14 and 15 the stick is combined with a metallic tube similar to the form shown in Figs. 9 and 10, except that the tube is vertically slotted at the sides, as seen at o.

In Figs. 16 and 17 I have shown a double-pointed stick, one point, O, being formed to make shade-lines, while the other point, O', makes a solid line. The stick is formed with a slit, o', which divides the two points, and one or both the latter may be provided with a thumb-screw, $o^2$.

It will be apparent that in each of the several forms shown and described I store the ink in a space adjacent to the point from whence it is fed through grooves or openings to the point.

Having fully described my invention, what I claim as new, and desire to secure by Letters Patent, is—

1. A marking-stick tapered to a point at one end and provided with side wings and grooves, substantially as described.

2. The combination, with a marking-stick, of a supplemental stick pivotally secured thereto, whereby the implement is adapted to mark in different colors at the same time, substantially as described.

3. A marking stick tapered to a point and split, grooved, or recessed to form wings and ink-channels, substantially as described.

In testimony whereof I have signed this specification in the presence of two subscribing witnesses.

CHARLES FISHER.

Witnesses:
   GEO. B. BURNET,
   W. A. OSTENFELDT.